(No Model.)
W. G. HAMILTON, Dec'd.
F. M. HAMILTON, Executrix.
ADJUSTABLE FIRE BOX PARTITION.
No. 593,213. Patented Nov. 9, 1897.
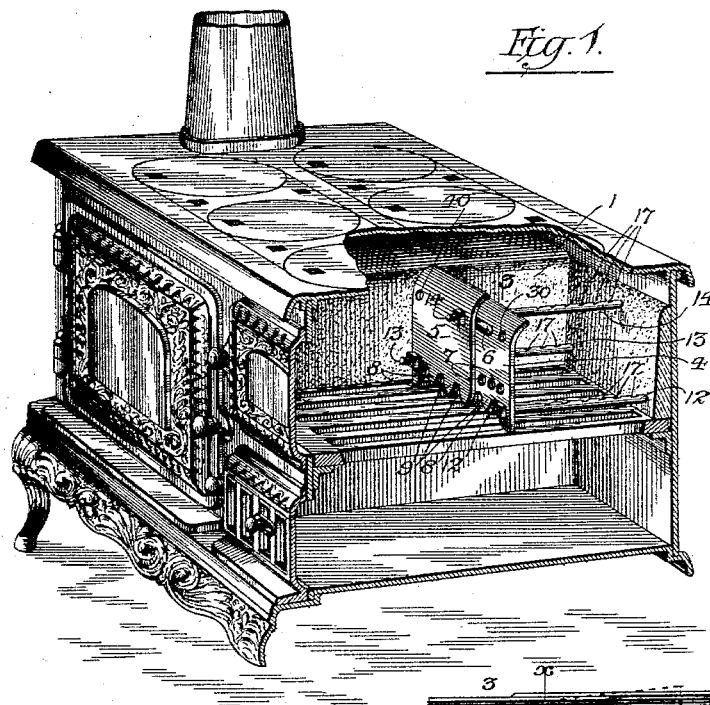
*Fig. 1.*
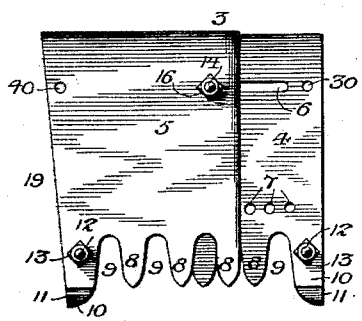
*Fig. 2.*
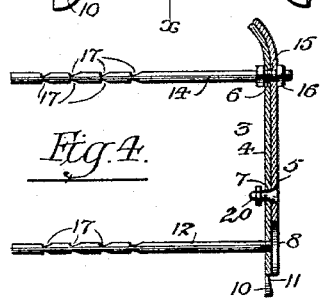
*Fig. 3.*
*Fig. 4.*
Witnesses:—
Louis M. F. Whitehead
Edwin Cruse
Inventor:—
William G. Hamilton
By his Attorneys,
C. A. Snow & Co.

UNITED STATES PATENT OFFICE.

WILLIAM G. HAMILTON, OF COLORADO SPRINGS, COLORADO; FRANCES MAY HAMILTON, EXECUTRIX OF SAID WILLIAM G. HAMILTON, DECEASED, ASSIGNOR OF ONE-HALF TO CARLETON GILBERT, OF NEW YORK, N. Y.

ADJUSTABLE FIRE-BOX PARTITION.

SPECIFICATION forming part of Letters Patent No. 593,213, dated November 9, 1897.

Application filed February 17, 1897. Serial No. 623,873. (No model.)

*To all whom it may concern:*

Be it known that I, WILLIAM G. HAMILTON, a citizen of the United States, residing at Colorado Springs, in the county of El Paso and State of Colorado, have invented a new and useful Adjustable Fire-Box Partition, of which the following is a specification.

This invention relates to fire-box partitions for cooking stoves and ranges, its object being to provide a partition that may be adjusted to fit varying sizes of fire-boxes in order that the interior of the fire-box may be divided into two sections and the fire be confined within one of the sections.
With this and other objects in view the invention consists in the details of construction and combination of parts hereinafter fully described, and particularly pointed out in the claims.
In the drawings, Figure 1 is a perspective view of a cook-stove with the front removed and part of the top broken away, showing my improved partition in place. Fig. 2 is an elevation of the partition, looking at the front side. Fig. 3 is a similar view looking at the opposite side. Fig. 4 is a vertical transverse section on the line *x x* of Fig. 2.

Similar reference-numerals indicate similar parts in the several figures.
1 represents the fire-box, and 2 the grate-bars. The partition is indicated as a whole by 3, and it consists of two sections, (marked 4 and 5, respectively.) The section 4 is provided near its upper end with an elongated opening 6 and near its lower end with a series of perforations 7, said perforations being arranged in a line parallel with the elongated opening 6. The lower end of the section is cut out to form a series of teeth, (indicated by 8,) the object of forming the lower ends in this manner being to provide openings 9 for the admission of air to the fire. The outer tooth on each section, which for the sake of distinction is marked 10, is longer than the intermediate teeth, and each of these teeth 10 is partially cut through transversely, as indicated at 11, substantially on a line with the ends of the teeth 9, for the purpose of weakening the teeth 10 at this point in order that their ends may be broken off, if necessary, to enable the partition to be set into a shallow fire-box. A rod 12 projects outwardly from the outer face of each section near its lower end and close to its outer edge, and these rods are detachably connected to the sections in any suitable manner. As shown in the drawings, the sections are perforated for the passage of one end of the rod, which is threaded, and nuts 13 are screwed on the threaded end of the rod, one on each side of the section, to clamp the section between them and hold the rod in position. It is to be understood, however, that I do not limit myself to this particular method of detachably connecting the rods to the sections.

14 represents another rod similar to the rods 12, having one end threaded, and this threaded end extends loosely through the elongated opening 6 in the section 4 and through a perforation 15 in the section 5. Nuts 16 are screwed on the threaded end of the rod 14, one of which engages the section 4 and the other the section 5, thereby clamping the two sections together and holding the rod 14 in position. Each of the rods 12 and 14 is provided with a series of notches 17 in its outer end portions, which notches are for the purpose of weakening the rods to enable them to be more readily broken at either of the notches, as may be desired, in order that the partition may be adjusted in fire-boxes of different lengths.

18 represents a pin projecting from the section 5 and adapted to fit in either of the perforations 7 in the section 4, by which means the lower ends of the sections are locked together against lateral displacement. The side edge 19 of the section 5, which is intended to engage either the front or the back wall of the fire-box, is inclined, as shown, in such manner that the lower end of the partition is of less width than the upper end in order that the partition may fit snugly into a fire-box which has either its front or its rear wall inclined inwardly at its lower end. The partition can be used irrespective of which of the walls is inclined, for if the rear wall of the fire-box inclines the partition will be placed in the stove so that the ends of the rods 12 and 14 will engage the right-hand end of the fire-box, and if the front wall of the fire-box is inclined it will be reversely arranged, as will be readily understood.

In the event both walls are perpendicular the nuts 16 on the top rod 14 will be loosened and the pin 18 will be engaged in one of the perforations 7 to make the lower end of the partition of proper width to fit in the fire-box, and the upper ends of the sections will be moved relatively to each other to bring the opposite side edges of the partition parallel to each other, as indicated in dotted lines in Fig. 3, when the nut 16 can be tightened up and the two sections be locked together in the proper position.

Instead of having a pin 18 projecting from the section 5 this section may be provided with a perforation adapted to register with either of the perforations 7 in the section 4, and a stove-bolt 20 may be used to adjustably connect these sections together at their lower ends, as indicated in Fig. 4.

It is of course to be understood that these partitions may be made of different sizes—that is, one size may be used for different-sized stoves or ranges such as are ordinarily used in private families, and a larger size may be made for use in the larger-size ranges or stoves, which are frequently used in hotels and restaurants.

It will be readily seen that by the use of my invention the fire-box may be divided and the fire confined in one end only of the fire-box, thereby economizing in the use of fuel, when desirable, and avoiding unnecessary heat in a room.

The sections 4 and 5 are preferably made of cast-iron, and the rods 12 and 14 are preferably made of malleable iron. The partition is loosely fitted in the fire-box with the teeth 10 resting on the grate, and the ends of the rods 12 and 14 abut against one end of the fire-box. The fire will hold the partition in place without any fastening devices between the partition and the stove, and the partition may be easily removed even when the fire is burning, should it be necessary.

In the event two persons should desire to cook on the stove or range at the same time, both using their own fuel, a stove-bolt may be substituted for the rod 14 to hold the two sections together at their upper ends, and the rod 14 and another rod similar to it may then be secured in the openings 30 and 40, where they will not materially interfere with the fire.

It will be understood that changes in the form, proportion, and minor details of construction may be resorted to without departing from the spirit or sacrificing any of the advantages of this invention.

Having thus described my invention, what I claim is—

1. A partition for a fire-box, consisting of two overlapping sections adjustably connected together and having a series of draft-openings at their lower ends, and a series of rods detachably connected to the sections near their upper and lower ends and projecting therefrom in substantially a horizontal plane to engage one of the end walls of the fire-box, the rod at the upper end of said sections serving also to connect the two sections together, substantially as described.

2. A partition for fire-boxes, consisting of two sections, one of said sections having an elongated opening in its upper end portion, and a series of perforations in its lower end portion, a device adapted to pass through either of said perforations and engage the other section to lock the lower ends of the sections together, a threaded rod passing through the said elongated opening and an opening in the other section, and projecting from the partition in substantially a horizontal plane to engage one end of the fire-box and support the partition vertically, and nuts on the threaded rod to engage opposite faces of the two sections and clamp them together, substantially as described.

3. A partition for fire-boxes consisting of two overlapping sections one having an inclined side whereby its upper end is wider than its lower end, and the other having parallel sides, and means to adjust the two sections relatively to each other and lock them together to form the partition either of equal or unequal width at top and bottom, whereby the partition may be adjusted to fit fire-boxes having vertical front and rear walls or having one vertical and one inclined wall, substantially as described.

In testimony that I claim the foregoing as my own, I have hereto affixed my signature in the presence of two witnesses.

WILLIAM G. HAMILTON.

Witnesses:
M. L. TAYLOR,
E. K. GAYLORD.